Patented Nov. 20, 1928.

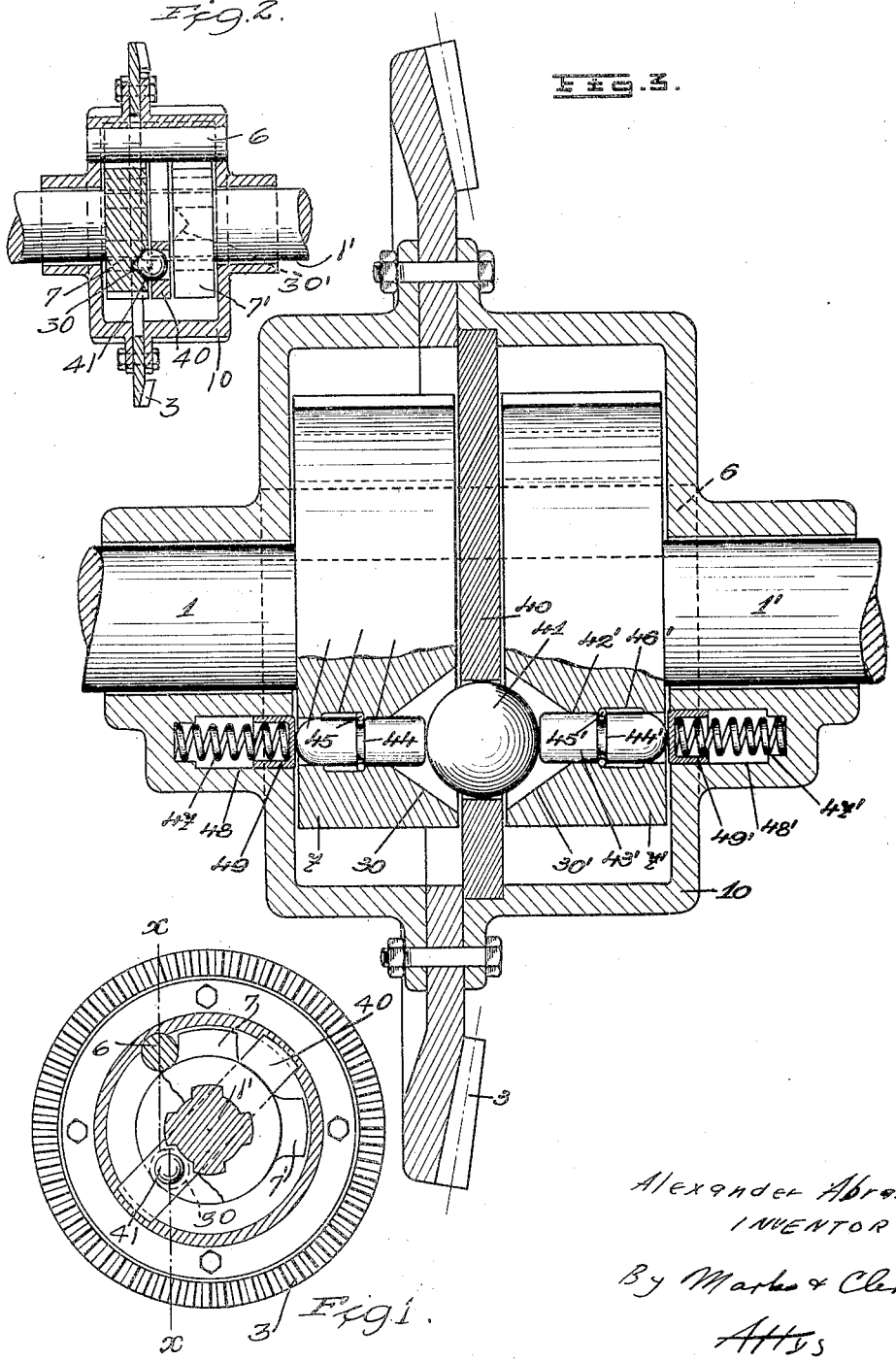

1,692,531

UNITED STATES PATENT OFFICE.

ALEXANDER ABRAMSON, OF PRAGUE, CZECHOSLOVAKIA.

POWER-TRANSMISSION MECHANISM.

Application filed July 21, 1927, Serial No. 207,526, and in Russia August 9, 1926.

This invention relates to a modification of the power transmission mechanism having a limited free movement, for use as differential gear, specially in motor cars, as described in my application No. 184,799 of the 18th April 1927, wherein during the free movement of one driving wheel shaft the coupling position between the driver and the shaft abutment on the other driving wheel shaft is ensured by a catch. In the said application No. 184,799, there is employed as a locking member a radially arranged bolt or pin rotatably supported in the driving casing and normally held with its part of semi-circular cross section in adjacent angular recesses in the driving wheel shaft abutments under spring action, in such a way that its flattened side faces the overrunning flanks of these recesses in the direction of rotation of the driving wheel shafts during forward travel.

The object of this invention is to simplify the device by employing as locking member a ball, which is axially guided by means of a cage held fast in the driving casing, in such a manner that the ball normally projects on both sides of the cage into the angular recesses, and the line joining the apices of these recesses passes through the centre of the ball. The abutment on each half axle which passes into a condition of free movement therefore presses the ball with the corresponding flank of its angular recess in an axial direction into the opposite recess so far that it bears on both flanks of this recess, and in this position that aperture in the ball cage which is opposite to the freely moving half-axle is shut off from the straight surface of the abutment of the freely moving half-axle. The other half-axle is thereby coupled to the driving casing. After the simultaneous rotation of the two abutments has been normally effected by the common driver connected with the driving casing, the ball takes up during normal travelling such a position that can pass into the recess in either abutment as occasion requires, for the purpose of coupling the latter to the driving casing.

The invention also relates to subjecting this ball to the action of two bolts or pins resiliently pressed towards its centre, which take up the axial thrusts which would otherwise be exerted by the ball upon the abutments. These pins pass through holes bored in the abutments, which open into the angular recesses in the said abutments, and these pins tend to keep the ball in its central position.

As soon as the ball is thrust to one side by one abutment beginning to move freely, the ball pushes the corresponding pin sideways parallel to the direction of the axis in such a way that the pin partly enters into a hole bored on the inside of the driving casing. The half-axle which is continuing to drive is thereby kept in the coupling position not only by the co-operation of the ball with the flanks of the angular recess in the corresponding abutment, but also by the pin being pushed partly into the aperture on the inside of the driving casing.

In the accompanying drawings two constructional forms of the driving clutch are illustrated:

Fig. 1 shows a cross section of one constructional form,

Fig. 2 a longitudinal section on the line $x$—$x$ in Fig. 1, and

Fig. 3 shows the second constructional form in longitudinal section on an enlarged scale.

The half-axles 1 and 1' are provided with the abutments 7 and 7' respectively, upon which there acts the common driving pin 6 arranged in the driving casing 10. The driving casing 10 is equipped with the driving gear 3. On the adjacent sides of the abutments 7 and 7' are formed the angular recesses 30 and 30' respectively.

According to the present invention, between the abutments 7 and 7' a diametrically arranged strip 40 is provided in the driving casing, and this strip axially guides a ball 41 in an aperture freely located facing the abutments 7 and 7' and acting as a ball cage. The arrangement is such that when the driving pin 6 acts simultaneously upon the two abutments 7 and 7', the line joining the apices of the recesses 30 and 30' passes through the centre of the ball 41, and the latter projects beyond the sides of the strip 40 in such away that it lies within the range of both the recesses 30 and 30'.

As will be seen from Figures 1 and 2, the half-axle carrying the abutment 7' has begun to move freely.

Under these circumstances the flank of the recess 30', which is over-running the direction of rotation, has displaced the ball 41 axially into the recess 30, and the ball is held in this position by the solid disc part of the abutment 7', in such a way that the said ball 41 bears against both flanks of the recess 30. The coupling of the half-axle 1 to the driving casing, further subsisting owing to the action of the driving pin 6 upon the abutment 7, is thus locked by the ball 41. When the abutment 7' comes back into the normal position, the recesses 30 and 30' lie opposite to one another, and under these circumstances the driving pin 6 takes both the abutments with it uniformly, so that the ball 41, being left to itself, can move in an axial direction.

In the case of the constructional form illustrated in Figure 3, the apertures 42 and 42', the axes of which are parallel to that of the axle, open into the angular recesses 30 and 30' in the abutments 7 and 7'. Into these apertures are inserted the pins 43 and 43'. Each pin has a groove 44, 44', in which is located a split ring 45, 45', which expands, when the pin is pushed into the aperture, into the enlargement 46, 46' of the aperture, and bears against the inner edge of the said enlargement 46, 46'. The position of the pin is thereby limited towards the ball. Each pin is pressed inwards by the spring 47, 47', so that the ball is normally held positively in a central position. The springs 47 and 47' bear at one end against the bottom of the aperture 48, 48' on the inside of the wall of the driving casing 10, and extend with their other ends each into a shoe 49, 49', which is guided in the aperture 48, 48'. Accordingly when the half-axle 1', to keep to the example according to Figure 2, begins to run freely with its abutment 7', the ball pushed towards the left will displace the pin 43 outwards, so that it projects partially into the aperture 48. The locking of the abutment 7, which is continuing to drive, is therefore accomplished not only by the ball 41, but also by the pin 43.

What I claim is:—

1. A power transmission mechanism having a limited free movement for use as a differential gear, especially in motor cars, comprising driving half-axles, abutments secured to said half-axles, said abutments being formed with angular recesses in their adjacent surfaces, a driving casing, a common driving pin arranged in said casing for normally driving said abutments, a ball cage stationarily located in the driving casing, a locking ball arranged between the angular recesses in the abutments and displaceable in a direction parallel to the axes in said ball cage, said locking ball being adapted to lock one of the abutments to the casing when the other abutment runs freely.

2. A power transmission mechanism having a limited free movement for use as a differential gear, especially in motor cars, comprising driving half-axles, abutments secured to said half axles, said abutments being formed with angular recesses in their adjacent surfaces, and with apertures passing axially outwards from the apices of said recesses, a driving casing formed with axial apertures, a locking ball arranged between the angular recesses in the abutments, said locking ball being adapted to lock one of the abutments to the casing when the other abutment runs freely, pins axially slidable in the apertures in the abutments, and bearing at their inner ends against the locking ball, and springs lodged in the axial apertures in the driving casing and tending to press said pins inwards to hold the locking ball in its central position, each of said pins being adapted to enter the corresponding axial aperture in the driving casing when the locking ball is displaced laterally in its direction, thereby assisting the locking of the abutment that remains in driving engagement.

3. A power transmission mechanism having a limited free movement for use as a differential gear, especially in motor cars, comprising driving half-axles, abutments secured to said half-axles, said abutments being formed with angular recesses in their adjacent surfaces, and with apertures passing axially outwards from the apices of said recesses, a driving casing formed with axial apertures, a locking ball arranged between the angular recesses in the abutments, a common driving pin arranged in said casing for normally driving said abutments, a ball cage stationarily located in the driving casing, a locking ball arranged between the angular recesses in the abutments and axially displaceable in said ball cage, said locking ball being adapted to lock one of the abutments to the casing when the other abutment runs freely, pins axially slidable in the apertures in the abutments, and bearing at their inner ends against the locking ball, and springs lodged in the axial apertures in the driving casing and tending to press said pins inwards to hold the locking ball in its central position, each of said pins being adapted to enter the corresponding axial aperture in the driving casing when the locking ball is displaced laterally in its direction, thereby assisting the locking of the abutment that remains in driving engagement.

In testimony whereof I have signed my name to this specification.

ALEXANDER ABRAMSON.